(12) United States Patent
Yabe

(10) Patent No.: US 10,632,890 B2
(45) Date of Patent: Apr. 28, 2020

(54) DUMP TRUCK DUMP BODY, AND DUMP TRUCK

(71) Applicant: Komatsu Ltd., Minato-ku, Tokyo (JP)

(72) Inventor: Yousuke Yabe, Hitachinaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/750,861

(22) PCT Filed: Mar. 16, 2016

(86) PCT No.: PCT/JP2016/058412

§ 371 (c)(1),
(2) Date: Feb. 7, 2018

(87) PCT Pub. No.: WO2017/158778

PCT Pub. Date: Sep. 21, 2017

(65) Prior Publication Data

US 2018/0229639 A1 Aug. 16, 2018

(51) Int. Cl.
*B60P 1/28* (2006.01)
*B60P 1/04* (2006.01)
*B60P 1/16* (2006.01)

(52) U.S. Cl.
CPC ............... *B60P 1/286* (2013.01); *B60P 1/04* (2013.01); *B60P 1/16* (2013.01); *B60P 1/28* (2013.01); *B60P 1/283* (2013.01)

(58) Field of Classification Search
CPC .. B60P 1/28; B60P 1/283; B60P 1/286; B60P 1/04; B60P 1/16

(Continued)

(56) References Cited

U.S. PATENT DOCUMENTS 6,086,076 A 7/2000 Prem et al.
D471,920 S 3/2003 Chaseling
(Continued)

FOREIGN PATENT DOCUMENTS

CA 2768403 7/2018
CN 1041729 5/1990
(Continued)

OTHER PUBLICATIONS

International Preliminary Report on Patentability in International Application No. PCT/JP2016/058412, dated Sep. 18, 2018, 6 pages, with English translation.

(Continued)

*Primary Examiner* — Stephen T Gordon
(74) *Attorney, Agent, or Firm* — Fish & Richardson P.C.

(57) ABSTRACT

A dump truck configured to move in both front and back directions and dump loads in a first one of the directions includes: a chassis including an engine within a wheelbase; and a dump body covering an upper portion of the chassis across an entire length in travel direction and an entire width in vehicle width direction, the dump body supported so as to be able to be raised and lowered via a hinge by a side of the chassis near which loads are dumped. The dump body includes: a first inclined a side of the dump body from portion rising upward from a bottom portion of the dump body toward the side thereof from which loads are dumped; and a second, inclined portion inclined downward from an upper end of the first inclined portion to an end of the side of the dump body from which loads are dumped.

11 Claims, 7 Drawing Sheets

(58) Field of Classification Search
USPC .... 298/7, 17 R, 19 R, 22 R, 22 P, 17 T, 1 C; 296/183.2; D12/15
See application file for complete search history.

(56) References Cited

U.S. PATENT DOCUMENTS

| | | | |
|---|---|---|---|
| 9,365,148 B2 * | 6/2016 | Reynolds | B60P 1/286 |
| | | | 298/22 R |
| 2008/0067856 A1 | 3/2008 | Hagenbuch | |
| 2012/0153705 A1 | 6/2012 | Reynolds et al. | |
| 2013/0094904 A1 | 4/2013 | Sepulveda | |
| 2014/0283422 A1 | 9/2014 | Cloutier | |
| 2015/0307012 A1 | 10/2015 | Keating et al. | |

FOREIGN PATENT DOCUMENTS

| | | |
|---|---|---|
| CN | 102470789 | 5/2012 |
| JP | S54-132114 | 9/1979 |
| JP | S62-059144 | 3/1987 |
| JP | H11-502481 | 3/1999 |

OTHER PUBLICATIONS

International Search Report in International Application No. PCT/JP2016/058412, dated May 31, 2016 (with partial English translation).

Canadian Office Action in Canadian Application No. 2,994,628, dated Aug. 2, 2018, 4 pages.

Chinese Office Action in Chinese Application No. 201680045551.7, dated Jul. 16, 2019, 13 pages (with English Translation).

* cited by examiner

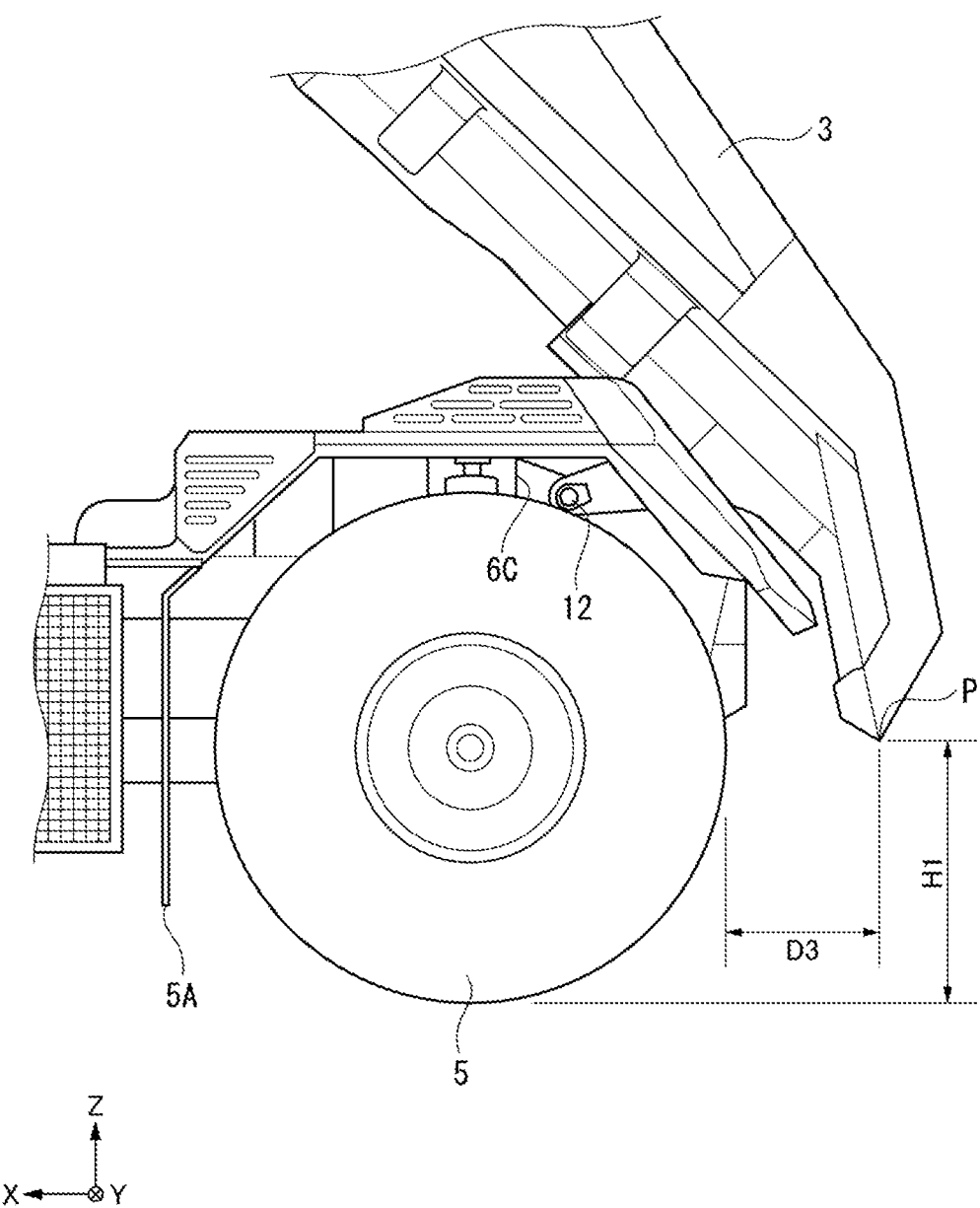

DUMP TRUCK DUMP BODY, AND DUMP TRUCK

CROSS-REFERENCE TO RELATED APPLICATIONS

This application claims priority to International Application No. PCT/JP2016/058412 filed on Mar. 16, 2016, the contents of which are incorporated herein in their entirety.

TECHNICAL FIELD

The present invention relates to a dump body for a dump truck and a dump truck.

BACKGROUND ART

There has been typically known a dump truck in which the centroid of loads is set to be positioned substantially in the middle of a wheelbase (see, for instance, Patent Literature 1).

Since the centroid of loads in such a dump truck is positioned substantially in the middle of a wheelbase, the dump truck provides advantages of easily loading earth and sand using a loading machine such as hydraulic excavator, enabling to reduce a load spill, and enabling to equalize loads applied to front wheels and back wheels.

CITATION LIST

Patent Literature(S)

Patent Literature 1: JP62-59144A

SUMMARY OF THE INVENTION

Problem(s) to be Solved by the Invention

However, in the technology of Patent Literature 1, since the earth and sand loaded into the dump body make a mountain substantially at the center of a chassis, when the dump body is raised to dump the loaded earth and sand, the loaded earth and sand fall at once to deteriorate a flow of the loaded earth and sand, so that some of the loaded earth and sand are left in the dump body.

In addition, since an end of the dump body, from which the loaded earth and sand are dumped, is at a high position from the ground when the dump body is raised, the earth and sand are scattered to gather on tires and the like when the earth and sand are dumped.

An object of the invention is to provide a dump body for a dump truck and a dump truck which allow a favorable flow of loads and reduce scattering of loads (e.g., earth and sand) when the loads are dumped.

Means for Solving the Problem(s)

According to an aspect of the invention, a dump body for a dump truck includes: a bottom portion; a first inclined portion rising upward from the bottom portion of the dump body toward a side of the dump body from which loads are dumped; and a second inclined portion inclined downward from an upper end of the first inclined portion to an end of the side of the dump body from which the loads are dumped.

According to another aspect of the invention, a dump truck configured to travel forward in both front and back directions and dump loads in one of the front and back directions includes: a chassis including an engine within a wheelbase; and a dump body covering an upper portion of the chassis across an entire length in a travel direction and an entire width in a vehicle width direction of the chassis, the dump body supported in a manner to be able to be raised and lowered via a hinge by a side of the chassis near a side of the dump body from which the loads are dumped, in which the dump body includes: a bottom portion; a first inclined portion rising upward from the bottom portion of the dump body toward the side of the dump body from which the loads are dumped; and a second inclined portion inclined downward from an upper end of the first inclined portion to an end of the side of the dump body from which the loads are dumped, and when the dump body is raised, a height of the end of the side of the dump body from which the loads are dumped is equal to a radius of each of tires of the chassis.

In the above arrangement, since the dump body includes the first inclined portion, the loads (e.g., earth and sand) can be smoothly guided to improve a flow of the loads during dumping.

Moreover, since the dump body includes the second inclined portion, an end of the dump body, from which the loads are to be dumped (hereinafter, the end is also referred to as the "dump end"), can be positioned closer to the ground during dumping, and the loads (e.g., earth and sand) can be less likely to be scattered during dumping.

In the above arrangement, preferably, the dump body further includes a third inclined portion rising upward from the bottom portion of the dump body toward an opposite side of the dump body from the first inclined portion, and a rising angle of the third inclined portion relative to a horizontal plane is larger than a rising angle of the first inclined portion relative to the horizontal plane.

In the above arrangement, preferably, a dimension from the upper end of the first inclined portion to a center of the chassis in a front-back direction is larger than a dimension from an upper end of the third inclined portion to the center of the chassis in the front-back direction.

BRIEF DESCRIPTION OF DRAWING(S)

FIG. 7 is a lateral view showing a positional relationship of a dump end of the dump truck during dumping in the exemplary embodiment.

DESCRIPTION OF EMBODIMENT(S)

Exemplary embodiment(s) of the invention will be described below with reference to the attached drawings.

[1] Description of Overall Structure of Dump Truck 1

Figure 1:
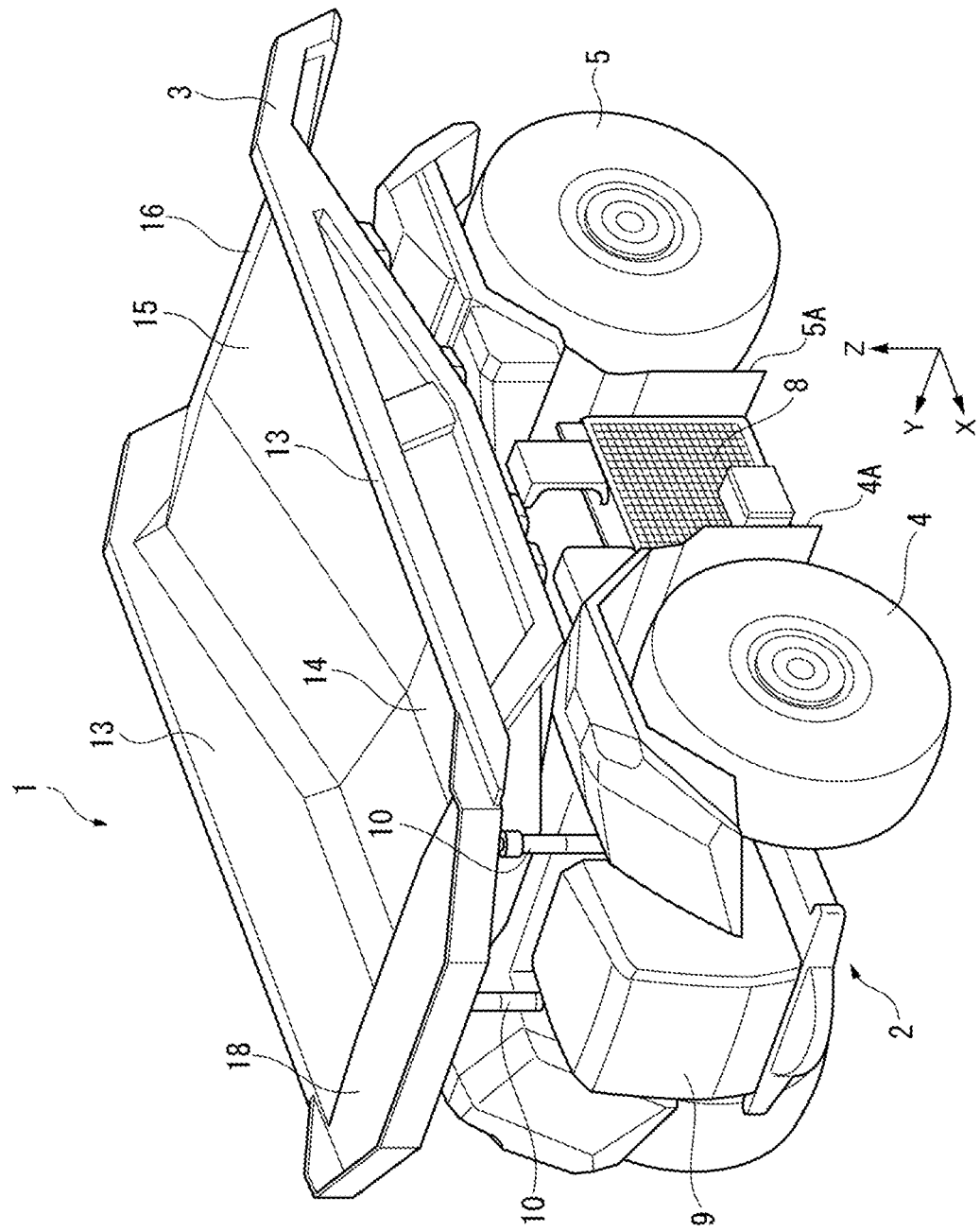
FIG. 1 is a perspective view showing a dump truck according to an exemplary embodiment of the invention.
Figure 2:
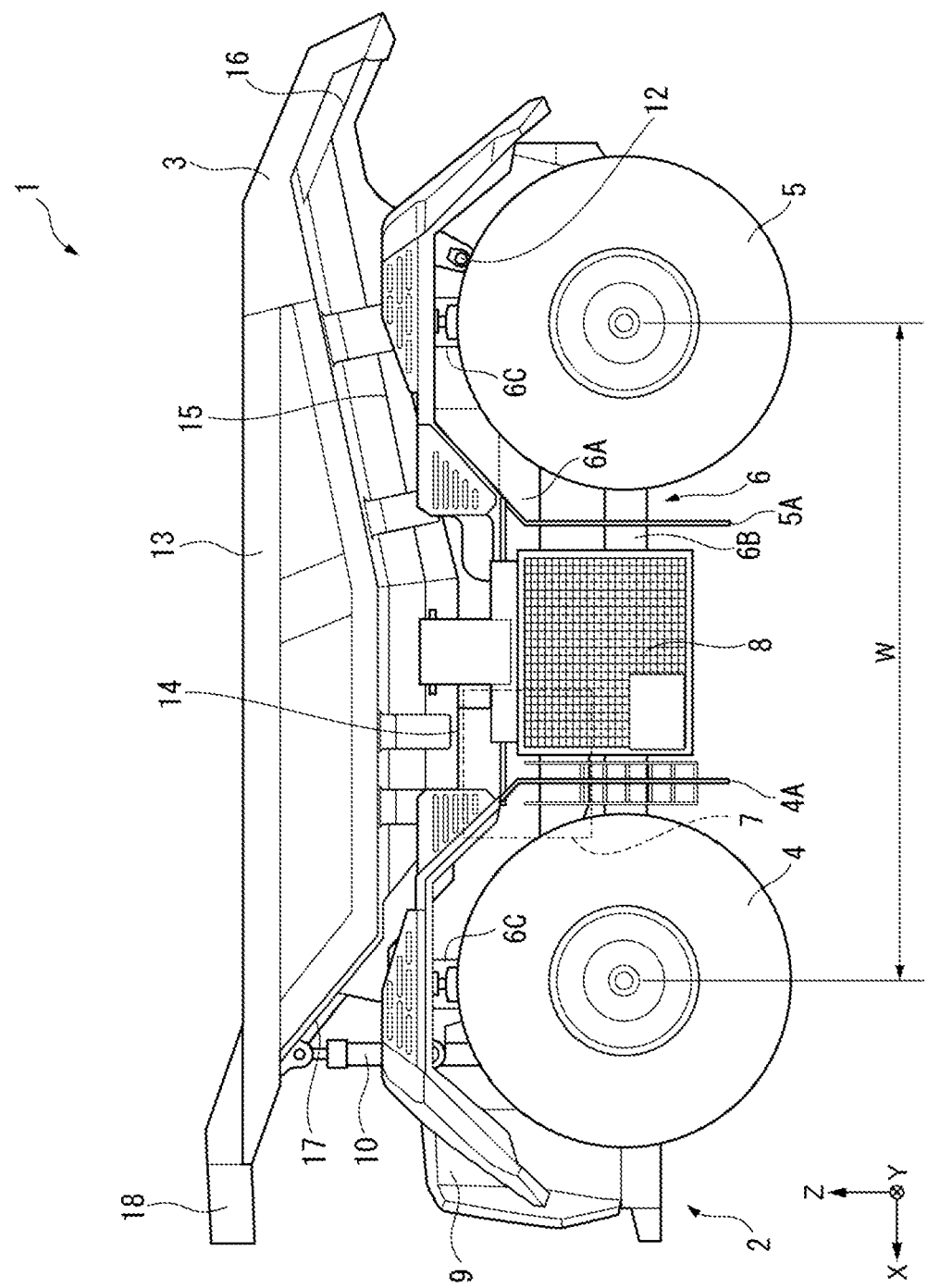
FIG. 2 is a lateral view showing the dump truck as viewed in a vehicle width direction in the exemplary embodiment.
Figure 3:
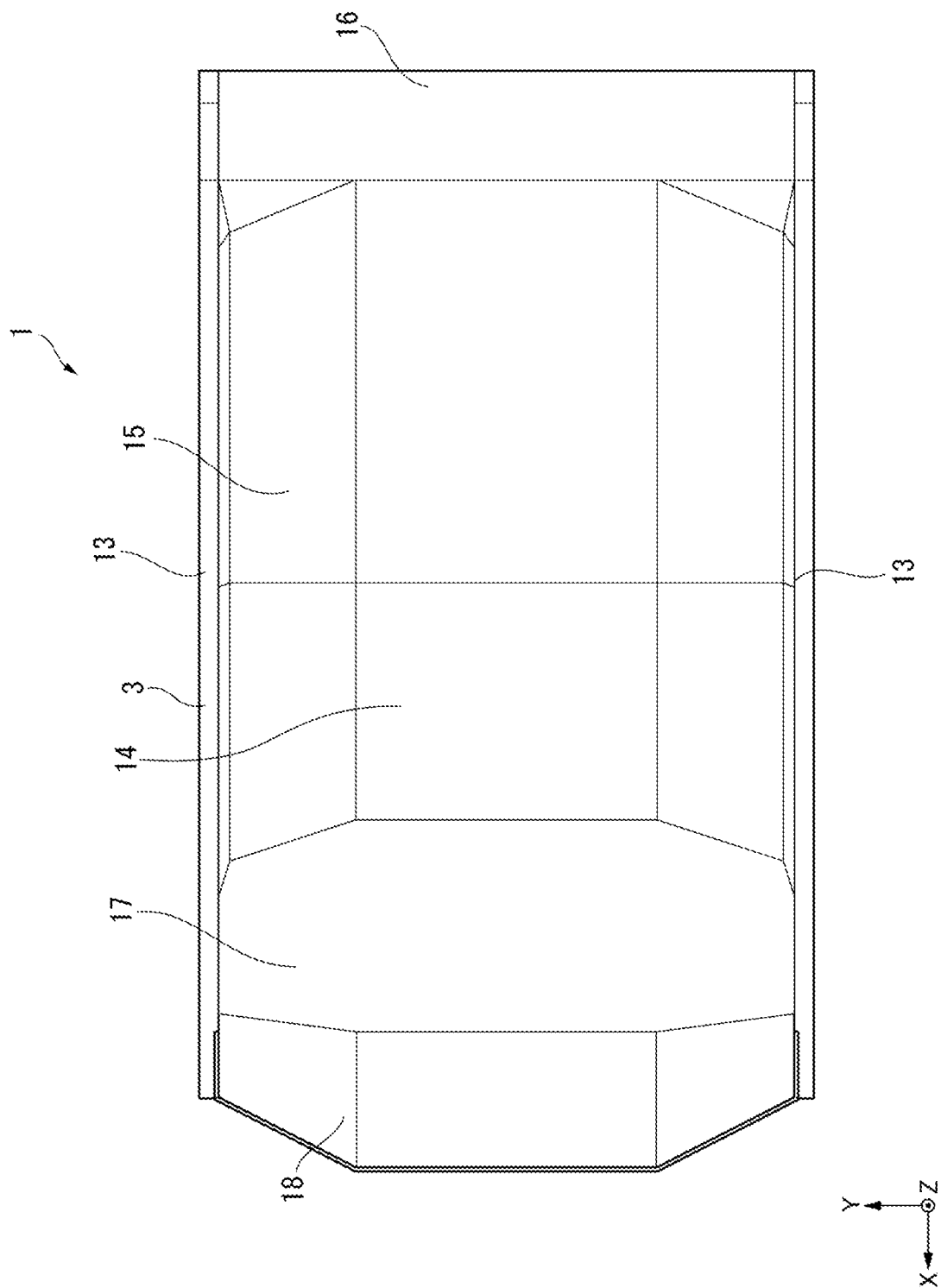
FIG. 3 is a plan view showing the dump truck as viewed from above in the exemplary embodiment.
Figure 4:
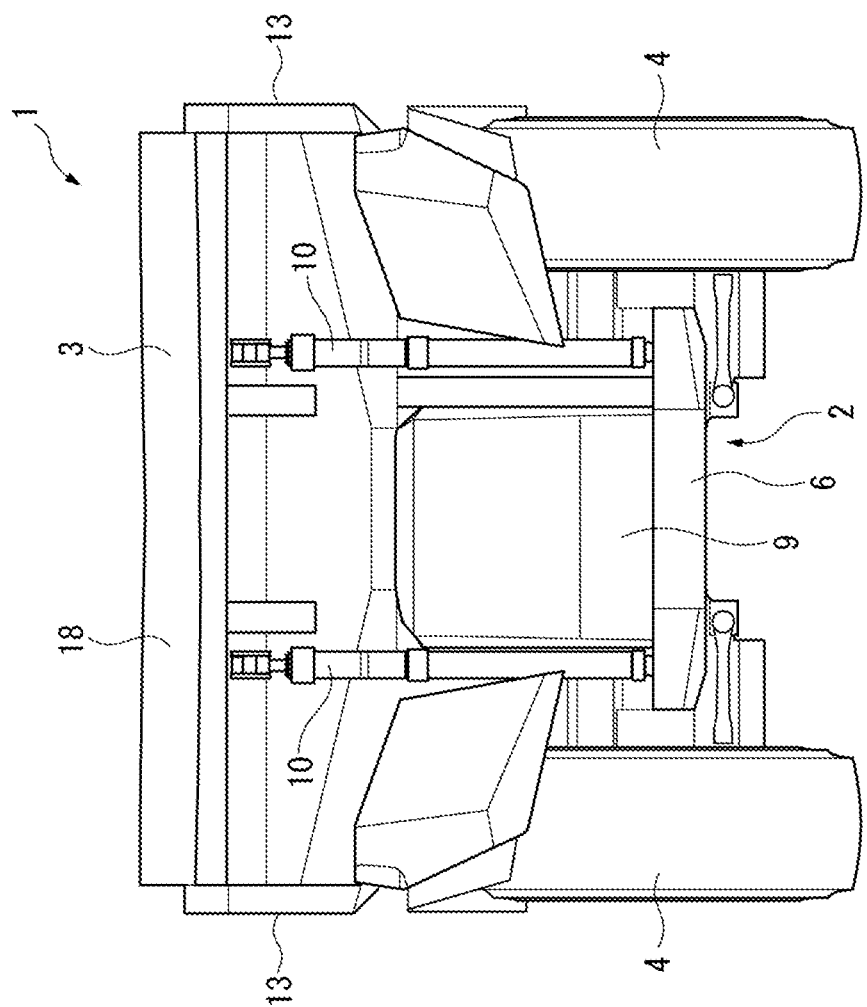
FIG. 4 is a lateral view showing the dump truck as viewed in a travel direction in the exemplary embodiment.

FIGS. 1 to 4 show a dump truck 1 according to an exemplary embodiment of the invention. FIG. 1 is a perspective view of the dump truck 1. FIG. 2 is a lateral view showing the dump truck 1 as viewed in a vehicle width direction orthogonal to a travel direction. FIG. 3 is a plan view showing the dump truck 1 as viewed from above. FIG. 4 is a lateral view showing the dump truck 1 as viewed in the travel direction.

It should be noted that X axis, Y axis and Z axis in the exemplary embodiment shown in each figure are orthogonal to one another. Further, the travel direction, the vehicle width direction and a vertical direction are defined as follows for the convenience of description in the exemplary embodiment. Specifically, with reference to FIG. 1, the travel direction of the dump truck 1 is represented by an arrow in the X axis (first travel direction being defined in the direction indicated by the arrow extending in the X axis, second travel direction being defined in an opposite direction from the first travel direction); the vehicle width direction is represented by the Y axis (first vehicle width direction being defined in the direction indicated by the arrow extending in the Y axis, second vehicle width direction being defined in an opposite direction from the first vehicle width direction); and the vertical direction is represented by the Z axis (first vertical direction being defined in the direction indicated by the arrow extending in the Z axis, second vertical direction being defined in an opposite direction from the first vertical direction). In the exemplary embodiment, a chassis 2 and a dump body 3 are each formed in a rectangular shape having forwarding sides, right side and left side. Accordingly, occasionally for convenience, the first travel direction is sometimes referred to as "front"; the second travel direction is sometimes referred to as "back"; the first vehicle width direction is sometimes referred to as "right"; and the second vehicle width direction is sometimes referred to as "left" in the exemplary embodiment below.

The dump truck 1, which is an unattended off-road dump truck configured to travel by a remote control, is an example of vehicles working at digging sites for developing mines. The remote control is conducted with full use of information communication technologies such as communication units and Global Positioning System (GPS) provided to a control center and the dump truck 1.

The dump truck 1 includes the chassis 2 and the dump body 3, and is configured to travel forward in both front and back directions with loads S (e.g., earth and sand) (see FIG. 5) being put in the dump body 3 and dump the loads in a minus X axis direction (i.e., the second travel direction in FIG. 1). It should be noted that "to travel forward" means the same movement of the dump truck forwarding in both the front and back directions since the front side and the back side of the dump truck are not differentiated from each other.

As shown in FIG. 2, the chassis 2 is supported in a manner to be able to travel with a pair of right and left tires 4 provided at a first side in the first travel direction and on both sides in the vehicle width direction and a pair of tires 5 provided at a second side in the travel direction and on both sides in the vehicle width direction. The chassis 2 includes a frame 6 elongated in the travel direction. The tires 4, 5 each are attached to the frame 6 via a suspension.

The frame 6 includes a pair of upper side members 6A respectively extending in the travel direction along both lateral ends of the chassis 2 and a pair of lower side members 6B respectively extending in the travel direction along both lateral ends of the chassis 2. The upper side members 6A are vertically separated from the lower side members 6B. Front and back ends of the upper side members 6A are connected to corresponding front and back ends of the lower side members 6B by a plurality of vertical members 6C. The pair of upper side members 6A provided in the vehicle width direction are connected to each other by a plurality of upper cross members extending in the vehicle width direction. The pair of lower side members 6B are connected to each other by a plurality of lower cross members extending in the vehicle width direction. In other words, the frame 6 forms a rectangular parallelepiped framework as viewed in the travel direction of the chassis 2.

An engine 7, at least one radiator 8, a controller 9, an obstacle detection sensor (not shown), and at least one hoist cylinder 10 are mounted on the frame 6. It should be noted that the dump truck 1, which is a dedicated vehicle for remote control, does not include such a cab for a driving operation as is provided in a typical dump truck.

The engine 7 is interposed between the upper side members 6A and the lower side members 6B of the frame 6. An upper portion of the engine 7 projects beyond the upper side members 6A.

Moreover, the engine 7 is provided at a back side of the tires 4 and disposed within a wheelbase W defined by rotation centers of the tires 4 and the tires 5, whereby the centroid of the dump truck 1 is substantially at the center of the chassis 2.

The at least one radiator 8 includes a pair of radiators provided substantially at the center and on both sides of the chassis 2 in the vehicle width direction and configured to cool a cooling water of the engine 7.

The controller 9 controls the travelling of the dump truck 1 based on sensor information of the obstacle detection sensor provided at a dump end P (see FIG. 5) of the chassis 2, a temperature sensor provided to the engine 7, rotation sensors provided to the tires 4, 5, and the like.

The at least one hoist cylinder 10 includes two hoist cylinders provided at a back side of the controller 9 and disposed in the vehicle width direction. Proximal ends of the two hoist cylinders are rotatably provided to the frame 6 while distal ends of the two hoist cylinders are rotatably provided to a lower surface of an opposite end of the dump body 3 from the dump end P.

The hoist cylinders 10 are actuated by receiving a hydraulic oil from a hydraulic pump (not shown) provided within the frame 6. The hydraulic pump is driven by the engine 7.

[2] Structure of Dump Body 3

As shown in FIG. 3, the dump body 3 serving as a dump body for a dump truck covers an entire length in the travel direction and an entire width in the vehicle width direction of the chassis 2 in a plan view. The dump end P of the dump body 3 extends beyond an end of the chassis 2. As shown in FIG. 3, the dump body 3 is shaped in a rectangular box in the plan view. It should be noted that the front direction is not differentiated from the back direction in the dump truck since the dump body 3 and the chassis 2 are rectangular in the front and back directions in the same manner. Accordingly, the dump truck can travel forward in both the front and back directions (for convenience, the front (side) and the back (side) are used for describing the dump truck). The dump body 3 is mounted on a body mount (not shown) provided to upper ends of the respective vertical members 6C.

The body mount is provided on an upper surface of the frame 6 and transmits the load of the dump body 3 to the vertical members 6C.

The dump body 3 is attached in a manner to be able to be raised and lowered via a hinge 12 to an end in the travel direction of the frame 6 near the dump end. Extension and contraction of the above-described hoist cylinder 10 raise and lower the dump body 3 with the hinge 12 of the frame 6 serving as a rotation shaft.

Figure 5:
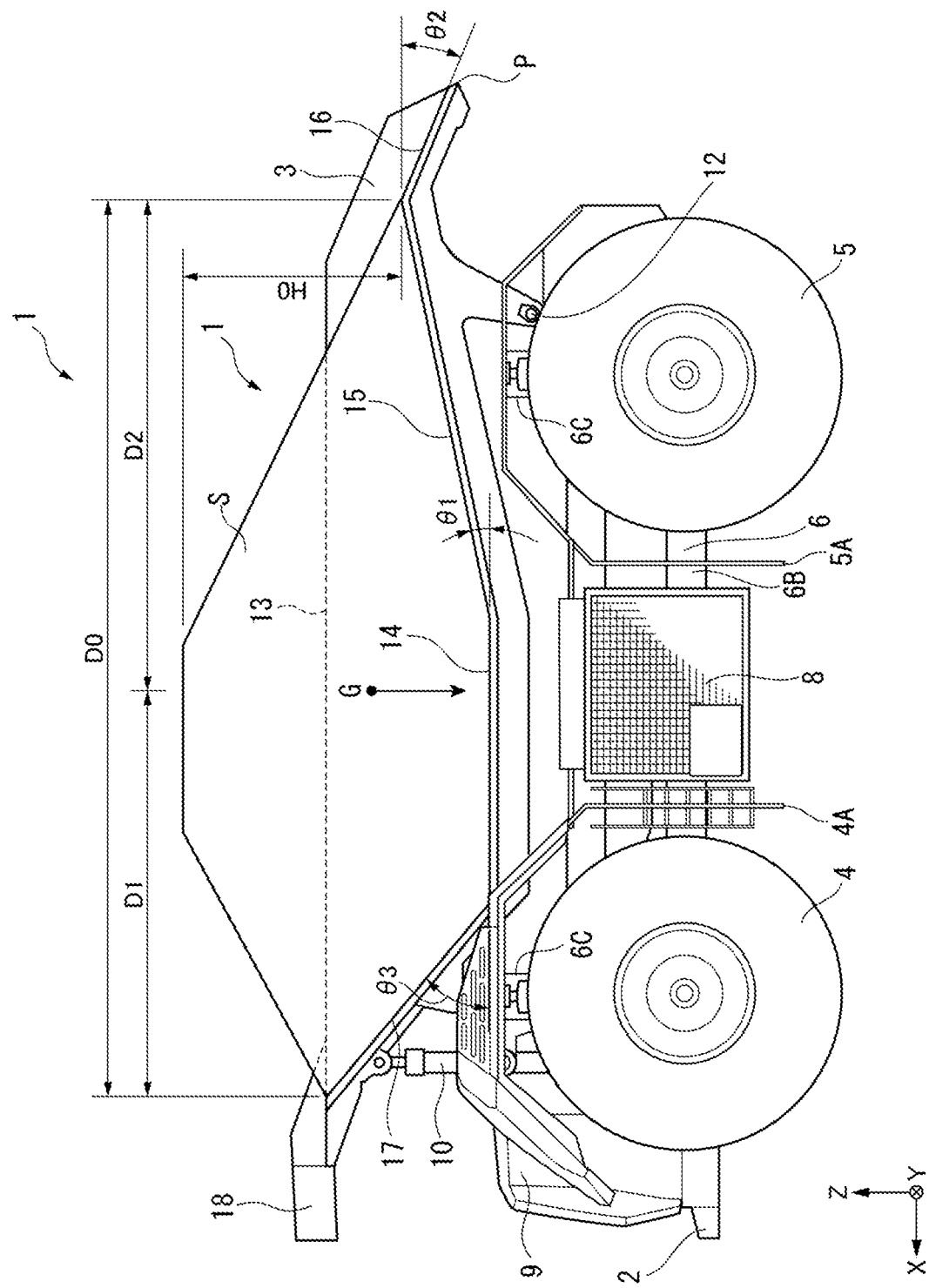
FIG. 5 is a lateral view for describing a shape of the dump truck in the exemplary embodiment.

As shown in FIGS. 3 and 5, the dump body 3 includes: a pair of side plates 13 extending along the travel direction of the chassis 2; a bottom portion 14 (bottom) provided between the side plates 13; a first inclined portion 15 rising upward from a back end of the bottom portion 14; a second inclined portion 16 inclined downward from an upper end of the first inclined portion 15 to the dump end P of the dump body 3; and a front portion 17 rising from an opposite edge of the bottom portion 14 from an edge from which the first inclined portion 15 rises. A horizontally projecting projection 18, which has a length enough to cover the controller 9 in the plan view, is provided to an upper end of the front portion 17. The loads S (see FIG. 5) (e.g., earth and sand) are not placed onto the projection 18.

The pair of side plates 13 are provided on opposing sides of the chassis 2 in the vehicle width direction and are each in a form of a steel plate extending in the travel direction of the chassis 2.

As shown in FIGS. 3 and 5, the bottom portion 14 is provided substantially at the center of the chassis 2 and is in a form of a steel plate horizontally extending in the travel direction and the vehicle width direction of the chassis 2.

The first inclined portion 15 is in a form of a steel plate rising diagonally upward from a back end of the bottom portion 14. A rising angle θ1 of the first inclined portion 15 relative to a horizontal plane defined as the bottom portion 14 is, for instance, determined to be 12 degrees.

The second inclined portion 16 is inclined downward from an upper end of the first inclined portion 15 to the dump end P of the dump body 3. An angle θ2 of the second inclined portion 16 being inclined downward relative to the horizontal plane is determined to be, for instance, 20 degrees. Since the second inclined portion 16 is inclined downward, the loads S (e.g., earth and sand) are not placed on the second inclined portion 16.

The front portion 17 (i.e., a third inclined portion) is in a form of a steel plate rising diagonally upward from a front end of the bottom portion 14. A rising angle θ3 of the front portion 17 relative to the horizontal plane defined as the bottom portion 14 is larger than the rising angle θ1 of the first inclined portion 15 and is determined to be, for instance, 40 degrees.

A dimension D1 is defined from the center of the chassis 2 in the front-back direction to the upper end of the front portion 17 of the dump body 3. A dimension D2 is defined from the center of the chassis 2 in the front-back direction to an upper end of the second inclined portion 16. A relationship between the dimension D1 and the dimension D2 is defined as D1<D2.

Accordingly, when the loads S (e.g., earth and sand) are placed on the dump body 3, a centroid position G of a mountain of the loads S becomes substantially at the center of the chassis 2. Moreover, when the loads S are placed on the dump body 3, a ratio (H0/D0) of a height H0 of the loads S to a length D0 of the loads S in the front-back direction is approximately 0.25.

Figure 6:
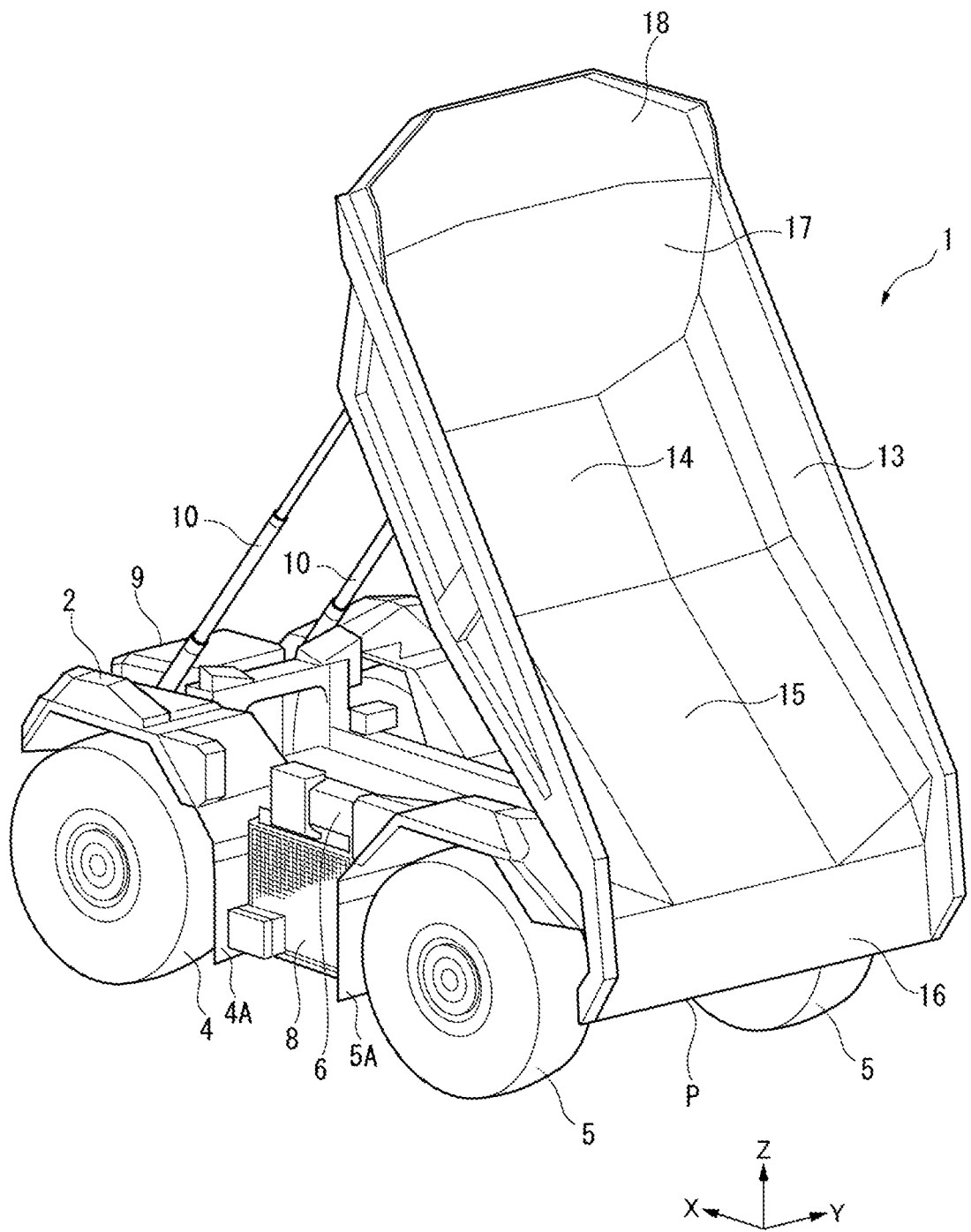
FIG. 6 is a perspective view showing a condition of the dump truck during dumping in the exemplary embodiment.

In the dump truck 1, when the hoist cylinder 10 is extended to the maximum to raise the dump body 3 and dump the loads S as shown in FIG. 6, the dump end P of the dump body 3 is positioned as shown in FIG. 7 at a height H1 ranging from 1800 mm to 2000 mm to be substantially the same as a radius of each of the tires 5. At this time, a horizontal dimension D3 from a back end of each of the tires 5 to the dump end P of the dump body 3 ranges from 1000 mm to 1500 mm.

[3] Advantage(s) of Embodiment(s)

The above exemplary embodiment provides advantages as follows.

Since the dump body 3 includes the second inclined portion 16, the dump end P of the dump body can be positioned closer to the ground during dumping, so that the loads S (e.g., earth and sand) can be less likely to be scattered during dumping.

Moreover, since a load ratio of a part of the loads S, which is placed from the center of the chassis 2 in the front-back direction to a side of the chassis 2 near the side of the dump body from which the loads S are dumped, relative to the rest of the loads S on an opposite side of the chassis 2 can be adjusted, the centroid position G of the loads S can be set in the vicinity of the center of the chassis 2 in the front-back direction, so that an even load is applied to the chassis 2 in the front-back direction to prevent occurrence of a load spill and the like during delivery.

Since the height H1 of the dump end P of the raised dump body 3 is made equal to the radius of each of the tires 5, the loads S are dumped below half a height of each of the tires 5. Accordingly, even when the loads S are scattered at the dumping, the loads S can be reliably prevented from gathering on the tires 5.

Since the rising angle θ3 of the front portion 17 is set larger than the rising angle θ1 of the first inclined portion 15, a distance required for dumping the loads S placed on or near the front portion 17 of the dump body 3 can be shortened, resulting in a further favorable flow of the loads S.

Since the dimension D2 defined from the upper end of the first inclined portion 15 to the center of the chassis 2 in the travel direction is set larger than the dimension D1 defined from the upper end of the front portion 17 to the center of the chassis 2 in the travel direction, more loads can be placed on a side of the dump body 3 from which the loads are dumped, resulting in an increase in the amount of the loads on the dump body 3 and a favorable flow of the loads during dumping.

Since the load ratio of the part of the loads S, which are placed from the center of the chassis 2 in the travel direction to the side of the chassis 2 near the side of the dump body from which the loads S are dumped, relative to the rest of the loads S on the opposite side of the chassis 2 can be adjusted, the centroid position G of the loads S can be set at or in the vicinity of the center of the chassis 2 in the travel direction.

[4] Modification(s) of Embodiment(s)

The invention is by no means limited to the above exemplary embodiment, but may include modification(s) below.

Although the dump truck 1 is in a form of an unattended off-road dump truck in the above exemplary embodiment, the invention is not limited thereto but may be applied to such a dump truck provided with a cab as described in the background art.

Particularly, the invention is suitably applicable to the invention disclosed in Patent Literature 1 (conventional art) (JP 62-59144A) described in the background art.

The rising angle θ1 of the first inclined portion 15, the inclination angle θ2 of the second inclined portion 16 that is downwardly inclined, and the rising angle θ3 of the front portion 17 are exemplarily indicated by numerical values in the above exemplary embodiment, but are not limited to the indicated numerical values. The angles θ1, θ2 and θ3 may be respectively set at appropriate values depending on the shapes and the dimensions of the dump body.

Further, the specific arrangements and configurations for implementing the invention may be altered in any manner as long as the modifications and improvements are compatible with the invention.

1 . . . dump truck, 2 . . . chassis, 3 . . . dump body, 4 . . . tires, 5 . . . tires, 6 . . . frame, 6A . . . upper side member, 6B . . . lower side member, 6C . . . vertical member, 7 . . . engine, 8 . . . radiator, 9 . . . controller, 10 . . . hoist cylinder, 12 . . . hinge, 13 . . . side plate, 14 . . . bottom portion, 15 . . . first inclined portion, 16 . . . second inclined portion, 17 . . . front portion, 18 . . . projection, D0 . . . dimension, D1 . . . dimension, D2 . . . dimension, D3 . . . horizontal dimension, G . . . centroid position, H0 . . . height of loads, H1 . . . height, P . . . dump end, S . . . loads, W . . . wheelbase, θ1 . . . rising angle, θ2 . . . angle, and θ3 . . . rising angle.

The invention claimed is:

1. A dump body for a dump truck that is configured to travel along a travel direction, the dump body comprising:
a pair of side plates; and
a bottom portion, a first inclined portion, and a second inclined portion that are provided between the pair of side plates,
wherein in a state in which the bottom portion is oriented parallel to the travel direction:
the first inclined portion is inclined upward relative to the travel direction from the bottom portion toward a side of the dump body from which loads are dumped, and
the second inclined portion is inclined downward relative to the travel direction from an upper end of the first inclined portion to a dumping end of the side of the dump body from which the loads are dumped.

2. A dump truck configured to travel forward in both front and back directions and dump loads in one of the front and back directions, the dump truck comprising:
a chassis comprising an engine within a wheelbase, the chassis being extended along a travel direction of the dump truck; and
a dump body covering an upper portion of the chassis across an entire length in the travel direction and an entire width in a vehicle width direction of the chassis, the dump body supported in a manner to be able to be raised and lowered via a hinge by a side of the chassis near a side of the dump body from which the loads are dumped,
wherein the dump body comprises:
a pair of side plates, and
a bottom portion, a first inclined portion, and a second inclined portion that are provided between the pair of side plates,
wherein in a state in which the bottom portion is oriented parallel to the travel direction:
the first inclined portion is inclined upward relative to the travel direction from the bottom portion toward the side of the dump body from which the loads are dumped, and the second inclined portion is inclined downward relative to the travel direction from an upper end of the first inclined portion to a dumping end of the side of the dump body from which the loads are dumped, and wherein based on the dump body being raised relative to the chassis, a height of the dumping end of the side of the dump body from which the loads are dumped is equal to a radius of each of tires of the chassis.

3. The dump truck according to claim 2, wherein
the dump body further comprises a third inclined portion rising upward from the bottom portion of the dump body relative to the travel direction toward an opposite side of the dump body from the first inclined portion, and
a rising angle of the third inclined portion relative to the travel direction is larger than a rising angle of the first inclined portion relative to the travel direction.

4. The dump truck according to claim 3, wherein
a dimension from the upper end of the first inclined portion to a center of the chassis in a front-back direction is larger than a dimension from an upper end of the third inclined portion to the center of the chassis in the front-back direction.

5. The dump body according to claim 1, wherein
the upper end of the first inclined portion corresponds to a rear end of the first inclined portion, and
the first inclined portion includes a lower end that corresponds to a front end of the first inclined portion and that is connected to the bottom portion.

6. The dump body according to claim 1, wherein the dump body is configured to be in (i) a first position in which the bottom portion is oriented parallel to the travel direction and (ii) a second position in which the bottom portion is inclined relative to the travel direction, and wherein the dumping end is positioned closer to a ground in the second position compared to the first position.

7. The dump body according to claim 1, wherein the bottom portion, the first inclined portion, and the second inclined portion are integrally formed.

8. The dump body according to claim 1, wherein each of a first angle between the bottom portion and the first inclined portion and a second angle between the first inclined portion and the second inclined portion are fixed.

9. The dump truck according to claim 2, wherein the dump body is configured to be in (i) a first position in which the bottom portion is oriented parallel to the travel direction of the chassis and (ii) a second position in which the bottom portion is inclined relative to the travel direction of the chassis, and wherein the dumping end is positioned closer to a ground in the second position compared to the first position.

10. The dump truck according to claim 2, wherein the bottom portion, the first inclined portion, and the second inclined portion are integrally formed.

11. The dump truck according to claim 2, wherein each of a first angle between the bottom portion and the first inclined portion and a second angle between the first inclined portion and the second inclined portion are fixed.

* * * * *